Patented Oct. 31, 1944

2,361,455

UNITED STATES PATENT OFFICE 2,361,455

METHOD OF NEUTRALIZING HYDROCARBON OIL

Vladimir L. Chechot, Philadelphia, Pa., assignor to The Atlantic Refining Company, Philadelphia, Pa., a corporation of Pennsylvania No Drawing. Application June 25, 1942, Serial No. 448,473

6 Claims. (Cl. 196—41)

The present invention relates to the treatment of hydrocarbon oils, and more particularly to improvements in the method of neutralizing hydrocarbon oils which have been subjected to treatment with sulphuric acid.

It has been conventional practice in the refining of hydrocarbon oils, especially viscous hydrocarbon oils, such as lubricating stocks derived from paraffin distillates, to subject such oils to treatment with sulphuric acid for the removal of color bodies and unstable compounds whose presence is detrimental in the finished oil. Upon completion of the acid treatment, the resulting acid sludge is separated from the oil, and the sour oil is neutralized with an alkali, for example, an aqueous solution of sodium hydroxide. In order to prevent the formation of emulsions during the neutralization, small amounts of rosin soaps or similar surface tension-reducing agents have been added in conjunction with the neutralizing agent. The neutralizing operation is usually carried out at elevated temperatures in the presence of open steam, so that the viscosity of the oil is reduced, better contact between the oil and the neutralizing agent is obtained, and a more rapid and complete separation of the neutralizing agent and the products of neutralization is effected. In many cases during the neutralization of the acid treated oil in the presence of rosin soaps and open steam, the neutralized oil acquires a rosin-like odor and an undesirable increase in color.

I have found that acid treated oils which normally form emulsions upon neutralization, may be neutralized without emulsification and without the use of rosin soaps or similar agents, by subjecting such oils to treatment with an aqueous solution of an alkali metal silicate, with or without the addition of an alkali metal hydroxide.

In accordance with my invention, hydrocarbon oil which has been treated with sulphuric acid, and from which the resulting acid sludge has been substantially removed, is intimately contacted with an aqueous solution of sodium or potassium silicate, preferably of relatively low concentration. Silicate solutions having a Baumé gravity between 5° and 15° have been found satisfactory. Silicate solutions of higher concentration may be employed, provided their viscosity is not too great to permit intimate contacting with the acid treated oil. The ratio of $Na_2O$ or $K_2O$ to $SiO_2$ in the silicates may vary over a wide range, for example, from 1:1 to 1:4. Commercially available sodium silicate having a composition $Na_2O.3.22SiO_2$ may be diluted with water to the desired concentration, for example, 10° Baumé, and such solution then used in the neutralization of the treated oil. The quantity of the silicate solution to be used depends upon the concentration of such solution, as well as upon the acidity of the oil to be neutralized. In general, from 5 per cent to 10 per cent by volume of the silicate solution, based upon the oil, has been found satisfactory. In lieu of the silicate solution, per se, I may utilize a mixture of silicate solution and alkali metal hydroxide solution, for example, two parts of sodium silicate and one part of sodium hydroxide.

My invention may be further illustrated by the following example, in which a comparison is made between use of a sodium silicate solution and a sodium hydroxide-rosin soap solution for the neutralization of an acid treated oil.

A lubricating oil stock having a Saybolt Universal viscosity of 300 seconds at 100° F. and an A. P. I. gravity of 24.5°, derived from a dewaxed paraffin distillate, was treated with 21 pounds per barrel of 66 sulphuric acid applied in two dumps. The resulting acid sludge was settled and separated from the treated oil, and such oil was divided into two portions.

One portion was vigorously agitated with 6.5 per cent by volume of sodium silicate solution obtained by diluting a 50° Baumé commercial sodium silicate with sufficient water to produce a 10 per cent aqueous silicate solution. The mixture of oil and silicate solution was then steamed with open steam, and then permitted to settle for two hours, whereupon the silicate solution containing products of neutralization was separated from the oil. No emulsification was encountered during the steaming operation. The oil was then washed with 10 per cent by volume of water and dried by air blowing.

The other portion of the sour oil was vigorously agitated with 3.7 per cent by volume of a 10 per cent solution of sodium hydroxide. To the mixture of oil and sodium hydroxide solution was added 1½ per cent by volume of rosin soap solution, and the resulting mixture was steamed with open steam. The mixture was then permitted to settle for two hours, and the sodium hydroxide-rosin soap solution containing products of neutralization was separated from the oil. The neutralized oil was then washed with 10 per cent by volume of water and dried by blowing with air.

The results of the above methods of neutralization are given in the following table:

| Properties | Silicate neut. oil | NaOH neut. oil |
|---|---|---|
| Yield, volume per cent | 97.0 | 95.8 |
| A. S. T. M. color | 2¼ | 3 |
| Neutralization number | 0.75 | 0.5 |
| Ash, weight per cent | 0.001 | 0.003 |
| Conradson carbon | 0.03 | 0.05 |
| Steam emulsion test | 210 | 642 |

It will be seen from the above results that neutralization of the acid treated oil with sodium silicate solution produced a finished oil superior in substantially all respects to the oil produced by neutralization with sodium hydroxide-rosin soap solution. Of particular significance is the marked improvement in color and steam emulsion test of the oil produced in accordance with this invention as contrasted with the oil produced by the conventional method involving the use of sodium hydroxide-rosin soap solution.

While the method of the present invention is particularly adapted for the neutralization of acid treated lubricating oil stocks which normally tend to emulsify under conventional treatment, such method is also applicable to the neutralization of oils which do not tend to emulsify.

I claim:

1. The method of neutralizing hydrocarbon oil which has been subjected to sulphuric acid treatment, which consists in intimately mixing the acid treated oil with an aqueous solution of an alkali metal silicate, subjecting the resulting mixture to a steam treatment with open steam, and separating the neutralized oil from the neutralization products.

2. The method of neutralizing hydrocarbon oil which has been subjected to sulphuric acid treatment, which consists in intimately mixing the acid treated oil with an aqueous solution of a sodium silicate, subjecting the resulting mixture to a steam treatment with open steam, and separating the neutralized oil from the neutralization products.

3. The method of neutralizing hydrocarbon oil which has been subjected to sulphuric acid treatment, which consists in intimately mixing the acid treated oil with from 5 per cent to 10 per cent by volume of an aqueous solution of sodium silicate having a Baumé gravity between 5° and 15°, subjecting the resulting mixture to a steam treatment with open steam and separating the neutralized oil from the neutralization products.

4. The method of neutralizing hydrocarbon oil which has been subjected to sulphuric acid treatment, which consists in intimately mixing the acid treated oil with an aqueous solution containing an alkali metal silicate and an alkali metal hydroxide, subjecting the resulting mixture to a steam treatment with open steam, and separating the neutralized oil from the neutralization products.

5. The method of neutralizing hydrocarbon oil which has been subjected to sulphuric acid treatment, which consists in intimately mixing the acid treated oil with an aqueous solution containing sodium silicate and sodium hydroxide, subjecting the resulting mixture to a steam treatment with open steam, and separating the neutralized oil from the neutralization products.

6. The method of neutralizing a sulphuric acid treated hydrocarbon oil which normally tends to emulsify upon treatment with an aqueous solution of sodium hydroxide, which consists in intimately mixing the acid treated oil with an aqueous solution of sodium silicate, subjecting the resulting mixture to a steam treatment with open steam, and separating the neutralized oil from the neutralization products.

VLADIMIR L. CHECHOT.